Oct. 21, 1930.    S. W. PARR    1,779,372
GAS CALORIMETER
Filed Aug. 26, 1927    2 Sheets-Sheet 2
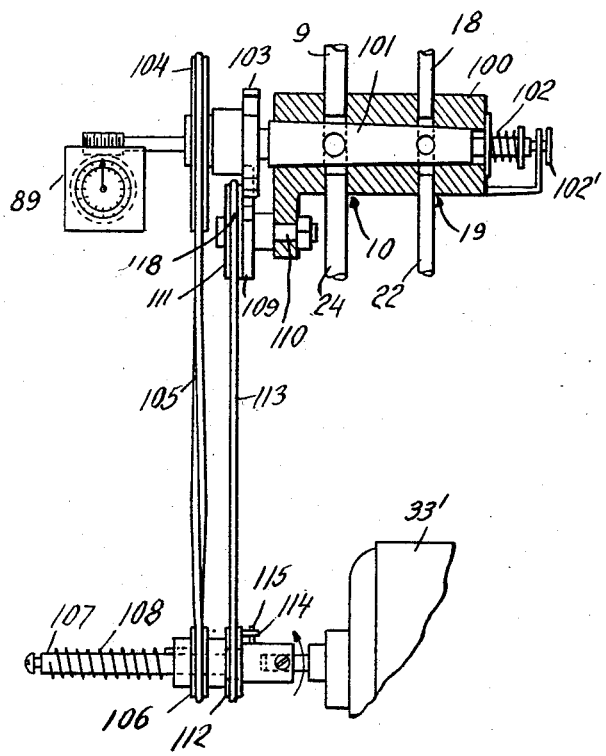
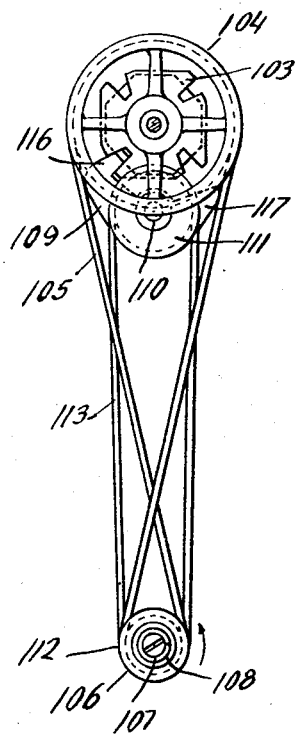
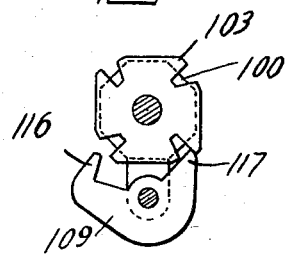
INVENTOR
Samuel W. Parr
BY
ATTORNEYS Patented Oct. 21, 1930

1,779,372

UNITED STATES PATENT OFFICE

SAMUEL W. PARR, OF URBANA, ILLINOIS, ASSIGNOR TO BURGESS-PARR COMPANY, OF MOLINE, ILLINOIS, A CORPORATION OF DELAWARE

GAS CALORIMETER

Application filed August 26, 1927. Serial No. 215,620.

This invention relates to gas calorimeters, the principal object of the invention being to provide an improved device for measuring the calorific value of any combustible gas, for example, ordinary producer gas. The invention is capable of providing a continuous indication or record of the calorific value of a combustible gas supplied from any source. This application is a continuation in part of my application Serial No. 93,405, filed March 9, 1926.

It will be appreciated that the heating value of any combustible gas can be determined by ascertaining its effect on a body of liquid, such as water, when the gas is burned in heat exchanging relation with the liquid. The calorific value of a gas is ordinarily expressed in British thermal units per cubic foot of gas under certain definite conditions of temperature and pressure. The B. t. u. has been defined as the quantity of heat required to raise the temperature of one pound of pure water one Fahrenheit degree. It is therefore apparent that if a cubic foot of gas under standard conditions of temperature and pressure ( say 60 degrees Fahrenheit and 30 inches of mercury) be burned under a cubic foot of water, then, neglecting radiation losses, the calorific value of the gas expressed in B. t. u. per cubic foot is equal to the change in temperature of the water expressed in degrees Fahrenheit, multiplied by the weight of a cubic foot of water. It is also true that the calorific value of a gas can be ascertained directly by noting the temperature change produced by the combination of the gas when certain volumes of the gas are burned so as to deliver their heat units to equal volumes of water.

One of the principal objects of this invention is to provide a calorimeter in which equal volumes of gas are burned under equal volumes of water at constant temperature and pressure whereby the calorific value of the gas can be determined by applying a single factor to the temperature rise caused by the combustion of the gas.

This invention contemplates the provision of means whereby a continuous flow of water to a suitable heater is accompanied by a continuous flow of gas to the burner of this heater. The flow of water and gas is controlled in such a manner that the volume of water supplied to the heater is equal to, or bears a predetermined relation to, the volume of gas supplied to the heater, and means are provided for insuring a constant temperature and pressure of the gas so supplied to the burner.

While the improved calorimeter is preferably constructed so as to deliver equal volumes of gas and water, it is to be noted that the quantity of gas or of water need not be ascertained in order to determine the calorific value of the gas. In other words, in order to determine the calorific value of the gas, it is not necessary to determine the amount or quantity of gas or of water passing through the calorimeter. The quantity of gas can be ascertained if this is desired, but it is not necessary to ascertain this factor in order to determine the calorific value of the gas.

The embodiment of the invention hereinafter described in detail includes means for raising the temperature of the water to a certain predetermined value prior to the entrance of this water into the heater wherein its temperature is raised by the gas being tested. The water may be preliminarily heated by any suitable means but I prefer to employ a gas burner for this purpose and to control the supply of gas to this burner by means responsive to the temperature of the preheated water, thus insuring a constant temperature. This embodiment of the invention also includes means for bringing the gas to be tested into heat exchanging relation with the preheated water, so that the temperature of the gas is raised to approximately the temperature of the preheated water. The improved device also includes a pressure regulator for controlling the flow of the gas which has been heated in the manner just described.

One feature of this invention comprises two containers, each having a water inlet and a gas inlet. A valve and suitable pipe connections are provided between the gas inlets or ports of these two containers and the burner which burns the test gas, and there is also a pipe connection to the source of heated or conditioned gas described above. This valve and the pipes communicating therewith are so arranged that at one instant the gas port in one of the containers is connected to the burner and the gas port in the other container is connected to the supply of conditioned gas.

A valve and a plurality of pipes, similar to the valve and pipe connections just described, are arranged so as to connect the water inlets or ports of the two containers with the water heater and with the source of preheated water. The water heater referred to is the one to which heat is supplied by the burner which consumes the test gas. This last mentioned valve and associated pipe connections are arranged so that at one instant the water port in one container is connected to the water heater and the water port in the other container is connected to the source of preheated water. The water and gas valves just described should be actuated in a definite timed relation and it is entirely feasible to actuate these valves by a single means, although of course separate means can be employed for this purpose. The two valves may be arranged to operate in such a manner that at one instant water is being supplied to the heated from one of the two containers, while gas is being supplied to the burner from the other container. After the major portion of the gas in the container has been supplied to the burner, the gas and water valves may be operated so as to reverse the connections and supply water to the heater from the container which previously supplied gas to the burner and to supply gas to the burner from the container which previously supplied water to the heater. Some means, such as a float switch connected in circuit with an electrical device for actuating the gas and water valves, can be used for controlling the change in the connections between the containers and the other parts of the device.

The apparatus here disclosed includes an improved heater in which the water is heated by the gas being tested. This heater is constructed in such a manner that there is a very efficient transmission of heat to the water. A mixing chamber is provided in fairly close proximity to the heating chamber, the purpose of this mixing chamber being to thoroughly mix the heated water prior to its coming in contact with the temperature sensitive element which serves to indicate or record the temperature of the heated water. An improved feature of this mixer is a device for supplying air to the stream of water flowing into the mixer. The stream of water entrains some of the air and the air bubbles serve to effect a thorough mixture of the water within the mixing chamber. It is preferred to have this air supply under control so that by adjusting the air port the rate at which water flows into the mixing chamber can be adjusted, as well as the amount of air discharged into the mixing chamber.

One of the features of this apparatus is the means for actuating the water and gas valves mentioned above. It is desirable to operate these valves in definite time relation and it is satisfactory to have the valve mechanism constructed in such a manner that rotation of the valve member through 90° effects the necessary change in directional flow of the gas and water. The improved valve actuating mechanism includes means for locking the valve member or members as the case may be, against accidental displacement, means for unlocking the valve member, means for rotating this member through a predetermined angle, and means for again locking the member in the new position. According to this invention, this series of operations is performed by a single motor connected in a manner hereinafter described, to the valve member and to the locking means for this member. This motor can be arranged so as to be started and stopped by the float switches described above as being arranged within the two containers which are alternately filled with water and gas.

One of the features of this invention is the provision of means for circulating the liquid through the apparatus instead of continuously taking in a fresh supply of liquid which is discharged after being heated. The invention contemplates the provision of cooling means in the circulation system for conditioning the liquid after it has been heated. This conditioning means may take the form of a cooling device supplied with a cooling medium from any suitable source.

Another feature of my invention is the provision of means for conditioning the air supplied to the burner. In order to avoid any errors in the indications or record made by the instrument, it is desirable to have the air brought to a predetermined temperature before it is supplied to the burner. It is also desirable to have the humidity of the air brought to a predetermined value. My invention contemplates the provision of means for conditioning the air both as to temperature and as to humidity; preferably by bringing the air into heat exchanging relation with the liquid used in the apparatus and preferably in actual contact with this liquid.

The various objects and advantages of this invention can be best understood by considering the following detailed description which is to be taken in conjunction with the accompanying drawing which comprises a diagrammatic representation of the complete apparatus.

As pointed out above, the improved calorimeter includes means for conditioning a continuous supply of water and a continuous supply of the gas to be tested. The pressure of the gas is carefully regulated so that the gas is delivered under conditions of constant temperature and pressure. Equal volumes of water are heated by equal volumes of the gas to be tested and this process is carried out in a substantially continuous manner. The calorific value of the gas is at once determined by means responsive to the difference in temperature between the conditioned water and the water which has been subjected to the heat of the burning test gas. Figure 1 is a diagrammatic view of the calorimeter apparatus embodying the improvements of the present invention;

Fig. 2 is a vertical sectional view of the water and gas valve mechanism and the means for operating the same;

Fig. 3 is an elevation of the parts shown in Fig. 2; and

Fig. 4 is an elevation, partly in section, of some of the parts shown in Fig. 2.

Figure 1:
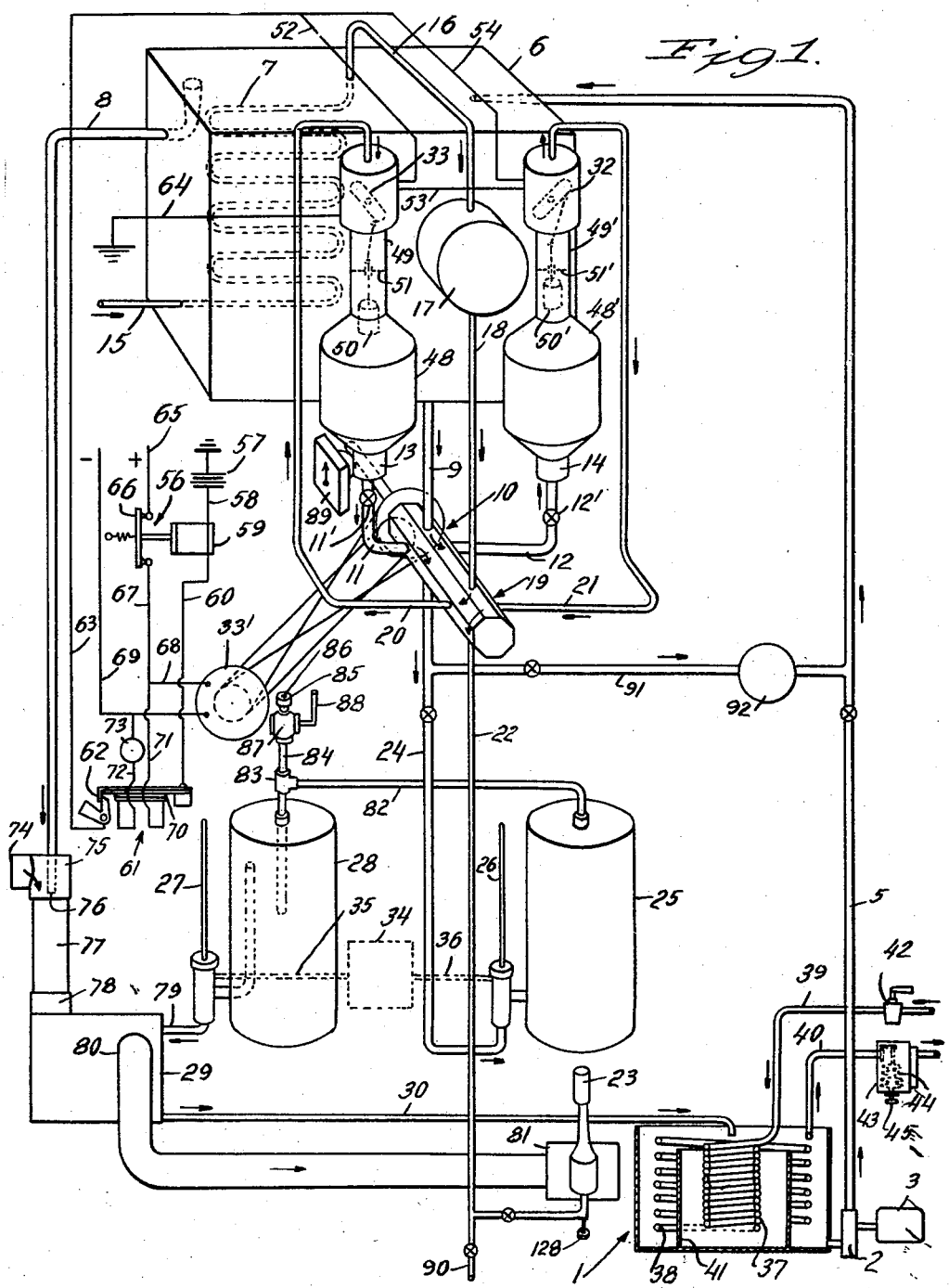

The apparatus illustrated in the accompanying drawing comprises a liquid conditioner 1 in the form of a cooling device having associated therewith a pump 2 for circulating the liquid, the pump being operated by a motor 3. A pipe 5 supplies the conditioned water to a tank 6, containing a coil 7. An overflow pipe 8 serves to maintain a constant water level within the tank 6. A pipe 9 delivers the water from the tank 6 to the water valve shown at 10, and pipes 11 and 12 extend between the valve housing and the containers 13 and 14. Water is alternately delivered to the containers 13 and 14 under the control of the valve 10.

The gas to be tested enters a temperature equalizing coil 7 within the tank 6 through a suitable pipe connection 15. The gas flowing in this coil 7 is brought to a temperature approximately the same as that of the preheated water which is supplied to the tank 6 by the pipe 5. The gas leaves the coil 7 through a pipe 16, passes through a pressure regulator 17, and through a pipe 18 to the gas valve 19. Pipes 20 and 21 connect the housing of this valve with the containers 13 and 14 respectively, and gas is alternately supplied to these two containers under the control of the valve 19. A pipe 22 connects the valve 19 with a burner 23, and a pipe 24 connects the water valve 10 with a heating tank 25. The gas to be tested is burned in the burner 23 and supplies its heat to the water within the tank 25. A thermometer 26 may be used for the purpose of measuring or indicating the temperature of the water entering the tank 25, and a similar thermometer 27 may be used for the purpose of indicating the temperature of the water after it has left the container 25 and passed through the mixing chamber 28. The water, after coming in contact with the temperature responsive element 27, may pass into a receptacle 29 and then through a pipe 30 to be discharged into the conditioner 1.

The method of operation of the calorimeter can be best understood by first considering the manner in which gas and water flow through the system when the valves 10 and 19 occupy one of their operating positions. The water which has been brought to a predetermined temperature in the conditioner 1, and which has brought the temperature of the gas to substantially this same temperature, is free to flow through the pipe connection 9, valve 10 and pipe 12, into the container 14. At the same time, water which has been previously supplied to the container 13 is now free to flow through pipe 11, valve 10 and pipe 24, to the heater 25. While this is taking place, gas, which has previously been supplied to container 14 and which is now being forced out of this container by the water entering the container through pipe 12, flows through pipe 21, valve 19 and pipe 22 to the burner 23. At the same time, gas from the coil 7 is flowing through pipe 16, pressure regulator 17, pipe 18, valve 19, and pipe 20, into the container 13 to take the place of the water which is flowing out of this container and into the heater 25. It is thus apparent that the gas which occupied container 14 is being utilized to heat the water which occupied container 13. This continues until the water entering container 14 raises to a predetermined level therein and actuates a float switch 32. This closes a control circuit for the motor 33' and as soon as power is supplied to this motor it operates to rotate valves 10 and 19 through an angle of 90°, thus reversing the connections to the containers 13 and 14. As soon as this happens, the water which has just flowed into the container 14 is now free to flow in the opposite direction through pipe 12, then through the valve 10 and through pipe 24 to the heater 25. Also, the gas which was previously supplied to the container 13 under the control of valve 19 is now free to flow back through pipe 20 and then through the valve 19 and pipe 22 to the burner 23. Thus gas from container 13 is now being used for heating the water from container 14. The valves 10 and 19 are operated fast enough so that the supply of gas to the burner 23 is not appreciably interrupted and the flame is not extinguished. Similarly, the flow of water through pipe 24 to the heater 25 remains substantially constant, even though at one instant the water is being supplied from container 13 and then as soon as the valve mechanism operates, from the other container 14. The difference in the indications of the two thermometers 26 and 27 gives a measure of the calorific value of the gas supplied to the burner 23, and it is evident that this indication or record is entirely independent of the quantity of gas or of water passing through the system. It is not necessary that the rate of flow of the gas should be any predetermined value; it is merely necessary that the volume of gas under predetermined conditions of temperature and pressure should bear a definite relation to the volume of water. It is preferred that the volume of gas should be equal to the volume of water. It is not necessary to have the containers 13 and 14 of the same size, inasmuch as gas from one of these containers is used to heat water from the other and then the process is reversed so that in the complete cycle it is inevitable that equal quantities of gas are used to heat equal quantities of water.

It will be understood that when the position of valve 10 is such that water can flow through pipes 9 and 11 into the container 13, the level of the water rises in this container until it actuates a float switch 33 similar to the float switch 32 in container 14. As soon as this happens, the motor is again actuated to turn the valves 10 and 19 through another 90° to again reverse the connections to the containers 13 and 14. The calorimeter thus continues to operate and the thermometers 26 and 27 give a continuous indication of the temperatures of the water before and after passing through the heater 25. If it is so desired, a differential recording device 34 of any well-known construction can be connected by means of the connections 35 and 36 in such a manner that the device is responsive to variations in the difference in temperature between the water flowing into the heater 25 and the water flowing out of the mixer 28. In this way a permanent record of the calorific value of the gas can be obtained, and the device can be calibrated so that the calorific value can be read off directly in terms of B. t. u.'s per cubic foot of gas.

Having given a general description of the manner in which the several parts of the improved device cooperate, a detailed description will now be given of each of the component parts of the device.

*The liquid conditioner*

The liquid conditioner shown in the accompanying drawing comprises a receptacle containing a cooling coil arranged in two parts as shown at 37 and 38. The cooling liquid, for example water from a city main, flows through a regulating valve 42, then through a pipe 39 into section 37 of the cooling coil. It then flows through section 38 of this coil, through a pipe 40 into a pressure regulating device shown at 43. This pressure regulator may be of any commercial form and for the purposes of illustration I have shown a pressure bellows 44 enclosed within the chamber of the pressure device and adapted to be adjusted by a screw 45 on the bottom of this device.

I prefer to arrange a baffle device such as that shown at 41 between the sections 37 and 38 of the cooling coil, and I also prefer to arrange the convolutions of the section 37 so close together that little, if any, liquid can pass between the successive convolutions. Accordingly, when the liquid to be cooled enters the cooling device it flows down to the bottom of the cooling device through the channel formed by the coil section 37, it then flows up and over the top of the baffle device 41 and comes in contact with the coil section 38. The liquid is then withdrawn from the cooling device by the pump 2 and forced back into the tank 6.

*The temperature equalizer*

As pointed out above, this invention contemplates the provision of some means for raising or lowering the temperature of the gas which is to be tested, to bring the temperature to some predetermined value. It will be understood that any suitable means may be employed for this purpose, but it is preferred to utilize the water after it passes out of the conditioner 1. A suitable device for bringing about this result comprises the tank 6, into which the water is discharged through the pipe 5 leading from the preheater 1. This tank is provided with an overflow vent pipe 8, which serves to maintain a constant water level within the tank 6. The gas which is supplied through a pipe 15 passes through the temperature equalizing coil 7 within the tank 6, and then passes through the pipe 16 to the pressure regulator 17. In this way the temperature of the gas is brought to a value substantially equal to that of the water in the tank 6.

*The gas and water containers*

The containers 13 and 14 mentioned above are adapted to receive the preheated water from the tank 6. This water flows through the pipe 9 to the valve 10 and it then flows alternately into containers 13 and 14 under the control of this valve.

In the embodiment of the invention illustrated in the accompanying drawings, the two containers 13 and 14 are of substantially the same dimensions and configuration. The container 13 has an enlarged portion 48 in open communication with an elongated upright portion 49. The container 14 has a similar enlarged portion 48', communicating with an upright portion 49' of smaller diameter. A float 50 is provided within the portion 49 of container 13 and a similar float 50' is provided in the portion 49' of the other container 14. These two floats are connected by suitable linkages to the switches 32 and 33, guides 51 and 51' being provided for the purpose of insuring true vertical movement of the floats 50 and 50'. The switches 32 and 33 may be of the ordinary mercury type arranged in such a manner that when the switch occupies one position, current may flow between the contacts of the switch through the mercury. The switch 32 is shown in this position. When the switch occupies a position such as the switch 33 occupies in Fig. 2, the circuit is broken. The contacts of the switches 32 and 33 are connected in parallel by means of leads 52, 53 and 54.

The floats 50 and 50' which control the operation of switches 32 and 33, are preferably arranged within the elongated upright portions 49 and 49' of the containers 13 and 14, in order that the operation of the switches may be critical. It will be understood that a small change in the volume of the liquid supplied to either of these containers will produce a correspondingly large change in the level of the liquid within the elongated upright portions of these containers.

The motor control system

The operation of the motor 33', which actuates the water and gas valves 10 and 19, is controlled by the float switches 32 and 33, located in the upper portions of the containers 13 and 14. These switches are electrically connected in parallel and serve to make and break a circuit which includes the relay 56. With switch 32 in the position shown, the relay circuit is closed, the circuit being as follows: source of current 57, lead 58, coil 59, of relay 56, lead 60, thermal relay 61, contact 62, lead 63, lead 54, switch 32, lead 53 and lead 64 back to the source of current 57. The operation of relay 59 closes a circuit for the motor 33, this circuit being as follows: supply lead 65, relay contacts 66, lead 67, lead 68, and supply lead 69. When this circuit is closed, current is supplied to the heating element 70 of the thermal relay 61, this current being supplied through leads 71 and 72. A lamp or other resistance unit 73 may be connected in series with the heating element 70, if this is so desired.

The float switches 32 and 33 are closed alternately due to the flow of liquid into first one of the containers 13 and 14 and then into the other, and it will be understood that the closing of either one of these switches causes the motor 33' to operate, and this motor in turn actuates the gas and water valves 19 and 10 respectively to reverse the connection to the containers 13 and 14.

The water heater

The water heater shown at 25 is illustrated and described in detail in my copending application Serial No. 93,405, filed March 9, 1926. While this copending application shows one form of suitable water heater, it is, of course, to be understood that other heat exchanging devices may be used in place of this particular heater. It is desirable to have the liquid absorb as much as possible of the heat supplied by the burner 23.

The air conditioning and liquid circulating system

It is desirable to have the pump 2 adjusted to operate at such a rate that some of the liquid discharged into the tank 6 will overflow through the pipe 8 and be discharged into the receptacle 29. This insures a fairly constant level of the liquid in the tank 6. In order that the operation of this portion of the system may be readily observed I prefer to insert a piece of glass tubing 77 in the path of the overflow liquid; so that the liquid discharged from the pipe 8 can be observed dripping into the receptacle 29. From this receptacle the water is supplied through pipe 30 to the cooling device and it is then cooled and pumped back into the tank 6.

In order to condition the air supplied to the burner, I have provided an air port shown at 74 for admitting air into the tube 77 where it comes in direct contact with the liquid dripping down into the receptacle 29. An air take-off pipe 80 communicates with the upper portion of the receptacle 29 and conveys the air to a chamber 81 enclosing the base of the burner 23. Accordingly, the air supplied to the burner is brought to a temperature approximating that of the liquid and its humidity is brought to a predetermined value by virtue of the air coming in direct contact with the liquid.

The mixing chamber

The mixing chamber shown diagrammatically at 28 is illustrated and described in detail in my copending application Serial No. 93,405, filed March 9, 1926. Any efficient type of mixing chamber can be employed, but I prefer to use that illustrated in my copending application. The mixing chamber 28 is connected to the water heater 25 by means of a pipe 82. This pipe, or a continuation thereof, is provided with an outlet disposed at a level somewhat remote from the top of the mixing chamber.

I have found that by providing an air port communicating with the pipe 82, it is possible to admit a restricted amount of air to the stream of liquid flowing into the mixing chamber. This air port also serves a useful function when the system is first started up, in that it permits the escape of any air which may become pocketed in that portion of the system adjacent to the air vent. This air port serves other important functions which will be pointed out below.

At 83 I have illustrated a T connection in the pipe 82 and it will be noted that a short piece of piping 84 communicates with this connection and is provided with a cap 85 having an orifice 86 in the end thereof. A valve 87, having a hand lever 88, can be used for controlling the entrance of air into the pipe 82. It has been found that if the valve 87 is wide open so that the maximum amount of air can flow into the pipe 82, the flow of liquid through pipe 82 will be retarded to a considerable extent. Furthermore, by adjusting the valve 87 to any desired position, the rate of flow of the liquid through pipe 82 can be regulated accordingly. Thus the air port and the valve for controlling the flow of air serve as a convenient means for regulating the flow of liquid into the mixing chamber 28.

Not only does the air connection just described serve as a means for controlling the flow of liquid, but it also serves as an efficient means for agitating the liquid within the receptacle 28. The air is carried into this receptacle after it has been entrained by the stream of liquid flowing through pipe 82 and it has been found that this air in bubbling up through the liquid in the receptacle agitates the liquid thoroughly. Accordingly, all variations in the temperature of the liquid flowing through pipe 82 are smoothed out or obliterated within the mixing receptacle 28 and the temperature of the liquid flowing out through pipe 79 remains constant, unless, of course, the average temperature of the liquid supplied to the container 28 changes. The pipe 82 projects down into the body of liquid within the receptacle 28 and causes the air entrained in the stream of liquid to bubble up through the body of liquid and agitate the same. While other means for agitating the liquid might be employed, yet I prefer to utilize for this purpose the air which is admitted through the orifice 86 and which also serves to regulate the flow of liquid through pipe 82.

The liquid in passing out of the container 28 through the pipe 79 flows into a chamber 29 adapted to receive the overflow liquid from the tank 6.

*The valve operating mechanism*

In Figures 2, 3 and 4, I have illustrated in considerable detail one embodiment of means for actuating the water and gas valves shown at 10 and 19 in Fig. 1. It is convenient, although not necessary, to have these two valves connected to or operated by a common member; this insures operation of the water and gas valves in proper timed relation. In Fig. 2, I have shown a valve casing or housing 100, enclosing a valve member 101 constructed so as to form the water and gas valves 10 and 19 respectively. The valve housing 100 is provided with a tapered bore, and the valve member 101 is of similar configuration. A spring 102 is arranged so as to hold the valve member in place within the tapered bore of the housing 100, and an adjustable set screw 102' is arranged so as to prevent the spring 102 from causing the valve member to become lodged in its seat.

From the description given above in connection with Fig. 1, it will be understood that the connection to the containers 13 and 14 can be reversed by rotating the valve member 101 through an angle of 90°. It is desirable to have some means for rotating this valve member and this means should be under the control of the float switches in containers 13 and 14. The motor 33' is adapted to rotate the valve member 101 and, as pointed out above, the operation of this motor is controlled by the float switches 32 and 33. This motor serves to not only rotate the valve 101, but also to lock this valve in its new position and to release the valve when it is necessary to rotate the valve through another angle of 90°.

Figures 2, 3 and 4 show a ratchet wheel 103 fixed with respect to a pulley 104 and both of these elements are keyed or otherwise fixed to the valve member 101. A belt 105 connects the pulley 104 with a driving pulley 106 loosely mounted on the shaft 107 of the motor 33'. A spring 108 has one end thereof fixed to the shaft 107 and the other end fixed to the pulley 106 and the motor transmits power to the pulley 106 though this spring. The teeth of the ratchet wheel 103 cooperate with a dog 109, mounted on a stub shaft 110. This dog is fixed with respect to a pulley 111 and this pulley is connected to a driving pulley 112 by means of a belt 113.

A pin or abutment 114 projects from the side of the pulley 112 and cooperates with a similar pin or abutment 115 fixed to the motor shaft 107. Accordingly power can be transmitted to the pulley 112 through the pins 114 and 115.

The mode of operation of the valve actuating mechanism may be described as follows:

With the motor 33' rotating in the direction indicated by the arrows in Figs. 2 and 3, the first effect of the motor is to rotate the motor shaft through approximately 180° while the pulleys 106 and 112 remain stationary. The ratchet wheel 103 is locked and this prevents the pulleys 106 and 112 from rotating at the start. It is only when the pins 114 and 115 come into engagement with each other that the pulley 112 is caused to rotate. This causes the pulley 111 to rotate through a small angle and disengage the locking projection 116 from the ratchet wheel 103. The pulley 104 is now free to turn and the tension in the spring 108 acts through the pulley 106 and the belt 105 to rotate the pulley 104 and the ratchet wheel and valve member 101 attached to this pulley. This continues until rotation of the ratchet wheel 103 is arrested by the abutment 117 (see Fig. 4) forming a part of the dog 109. Further rotation of the dog 109 and of the ratchet wheel 103 are thus prevented and the belt 113 commences to slip on the pulley 112. This slipping may be localized at this pulley by providing a pin 118 passing through the belt 113 and into the pulley 111. When rotation of the pulley 104 is arrested in the manner just described, continued rotation of the motor 33' serves to wind up the spring 108 to an even greater extent and ultimately the belt 105 commences to slip. By this time the operation of the motor 33' is interrupted due to the operation of the float switch in one of the containers 13 and 14 (see Fig. 1). As soon as the current supplied to the motor 33' is cut off, the spring 108 is free to recoil and this action of the spring serves to rotate the motor shaft in the direction opposite to that in which it was previously rotating. This causes the dog 109 to rotate so as to separate the abutment 117 from the ratchet wheel 103 and to force the projection 116 into an adjacent tooth of the ratchet wheel. These parts are preferably so constructed and arranged that as the projection 116 enters the tooth opposite the same, the ratchet wheel is forced around or advanced through a small angle and the ratchet wheel is then locked in this new position. This construction is desirable because it prevents the abutment 117 from engaging the same tooth of the ratchet wheel twice in succession. If the float switch fails to operate, the thermal relay 61 operates to break the motor circuit.

The motor 33' not only rotates the valve member 101, but it causes this valve member to be locked in its new position and it also serves to release the valve member when it is desirable to have it roatate through another angle, to again change the connections to the containers 13 and 14 above described. The operation of the spring 108 in reversing the angular movement of the dog 109 can be made more positive by making the belt 105 out of resilient material such as rubber, or by making it out of a coiled spring.

My improved means for actuating the valve member 101 has been found to be very reliable; it causes the valve member to be rotated very quickly through a complete angle of exactly 90° and the valve member is effectively locked in this position against accidental displacement until the dog 109 is actuated so as to release the valve member and permit continued rotation thereof.

Method of operation

In the particular embodiment of the invention illustrated in the accompanying drawings, water or some other suitable liquid is supplied to the container 1. This device serves the purpose of bringing the temperature of the liquid to some predetermined value. I have shown cooling coils 37 and 38 for bringing the temperature of the liquid to a predetermined value. The liquid after having its temperature brought to a predetermined value, then flows into a tank 6, where it comes into heat exchanging relation with a coil of pipe 7, through which the gas to be tested flows. The tank 6 and the coil 7 may be considered as a means for equalizing the temperatures of the gas and water or other liquid passing through these parts of the apparatus. The gas and liquid are then supplied alternately to each of the containers 13 and 14 under the control of valves 10 and 19 which are operated by the motor 33'. Hand operated valves 11' and 12' may be used for independently regulating the flow of liquid into each of the containers 13 and 14.

A pressure regulator 17 controls the supply of gas to the containers 13 and 14. The details of a suitable regulator for this purpose are shown in my copending application Serial No. 93,405, filed March 9, 1926.

The liquid which is supplied alternately to containers 13 and 14 actuates the float switches 32 and 33 and the switches in turn control the operation of the valves 10 and 19. The liquid flows out of the containers 13 and 14 into the heater 25 through a pipe 24, and in like manner the combustible gas flows out of containers 13 and 14 to the burner 23 through pipe 22. It will be understood that the gas is forced out of containers 13 and 14 by the liquid flowing into these containers from the tank 6. The rate at which gas flows out of containers 13 and 14 and consequently the rate at which liquid flows into these containers is determined by the adjustment of the valve 128. By opening the valve 128, the rate of flow of the gas can be increased and consequently the liquid flows into the containers 13 and 14 at a faster rate. The rate at which liquid flows out of containers 13 and 14 can be controlled by regulating the supply of air to the pipe 82 which connects the heater 25 with the mixer or temperature equalizer 28. The rate at which liquid flows out of containers 13 and 14 determines the rate at which gas flows into these containers through the pressure regulator 17. It is desirable to have the heater 25 so located with respect to the containers 13 and 14 and the valve 10 that liquid stops flowing out of the containers 13 and 14 even before the valve 10 is turned so as to establish communication with the liquid supply pipe 9. It is desirable to have the heater 25 arranged so that the level of the liquid therein is somewhat above the valve 10. These parts are not shown in this position in the accompanying drawing because of the difficulties involved in showing the parts in this desired relation to each other, and of course this desirable result can be accomplished in ways other than that just described.

Inasmuch as liquid stops flowing out of say container 13 before the valve 10 operates to connect this container to the liquid supply pipe 9, it will be apparent that the gas pressure within container 13 has an opportunity to build up before the valve 10 operates. This pressure builds up until the supply of gas is cut off by the pressure regulator 17. The improved device thus provides means whereby the gas can be supplied to containers 13 and 14 at a substantially constant predetermined pressure, and furthermore the temperature equalizer represented by the parts 6 and 7 makes it possible to supply this gas at a constant predetermined temperature.

While it is not necessary to determine the quantity of either the gas or the liquid passing through the system in order to determine the calorific value of the gas, yet it is entirely feasible to determine the quantity of gas or of liquid or both passing through the system. The containers 13 and 14 and parts associated therewith serve to isolate or measure off equal volumes of gas and liquid under constant conditions of temperature and pressure, and in order to determine the total amount of gas or liquid or both passing through these containers, it is merely necessary to measure the capacity of each and to ascertain the number of times each is filled with gas and liquid. By determining the number of revolutions of the valve member, it is possible to ascertain the quantity of gas or liquid or both passing through the system, because for every revolution of this valve member, a definite quantity of gas and a definite quantity of liquid pass through the containers 13 and 14. Accordingly a revolution counter connected to the valve member can be used as a means for measuring the quantities of the fluids passing through the system. I have illustrated such a counter at 89 in Figs. 1 and 2. This device may be provided with scales which cooperate with a suitable pointer to indicate directly the quantity of liquid passing through the system and the quantity of gas passing through the system. Accordingly, my improved device can be used as a gas meter as well as a means for determining the calorific value of a combustible gas. Where it is used merely for the purpose of measuring the quantity of gas, it is of course not necessary to burn the gas in the burner 23; it can be supplied to a gas main through a pipe 90, as indicated in the drawing. Furthermore, it is not necessary to heat the liquid where the device is used merely as a means for measuring the quantity of a fluid passing through the same. The liquid may be withdrawn from the containers 13 and 14 through a pipe 91 and brought back to the supply pipe 2 by some suitable means such as a pump 92.

The thermometers 26 and 27 can be used as a means for indicating the temperatures of the water as it flows into the heater 25 and as it leaves the mixer or temperature equalizer 28. In order that a permanent record of the calorific value of the gas may be obtained, a recording instrument 34 of any ordinary construction can be connected, as indicated at 35 and 36. This instrument operates as a differential temperature recording device and may be calibrated so as to indicate the calorific value of the gas. This instrument may be located close to the heater 25 or at some remote point, and of course a plurality of such instruments can be employed and located at various points, if this is so desired.

The circulating system forming a part of my invention is of a particular value because it makes it possible to use a liquid, such as distilled water, and only a small quantity of the liquid is necessary. It is oftentimes desirable to use distilled water or some other liquid which can be circulated through the system, rather than to use city water which would flow into the system and then to waste after being heated. City water oftentimes contains considerable sediment and it has been found that the heat applied to the liquid promotes the growth of any organisms contained in the water and this may proceed to such an extent as to clog the system. All of this can be eliminated by using distilled water or some liquid free from sediment and free from vegetable matter or living organisms of any kind.

It is to be understood that my invention is not limited to the particular embodiment illustrated and described but includes such modifications thereof as fall within the scope of the appended claims. The details of construction and the arrangement of the various parts can be varied without departing from the spirit of the invention. Furthermore, for some purposes, certain parts of the apparatus may be even eliminated without sacrificing all of the advantages of the invention.

Having thus described the invention, what I claim is:

1. In a device of the type described, the combination of a liquid container, a gas burner for supplying heat to liquid in said container, means for supplying a volume of liquid to said container, means for supplying to said burner a volume of gas bearing a predetermined relation to the volume of liquid supplied to said container and having a predetermined temperature and pressure, and means for supplying to the burner air having a predetermined temperature.

2. In a device of the type described, the combination of a liquid container, a gas burner for supplying heat to the container, means for continuously supplying an equal volume of liquid and gas to the container and burner, respectively, the gas being supplied under predetermined conditions of temperature and pressure, and means for supplying to the burner air having a predetermined temperature.

3. In a device of the type described, the combination of means for supplying a liquid, means for bringing the liquid to a predetermined temperature, a container adapted to receive this liquid, a gas burner for supplying heat to the liquid in said container, means for supplying to the burner a volume of combustible gas bearing a predetermined relation to the volume of liquid heated in said container, and means for supplying to the burner air having a predetermined temperature.

4. In a device of the type described, the combination of means for supplying a liquid, means for bringing the liquid to a predetermined temperature, a container adapted to receive this liquid, a gas burner for supplying heat to the liquid in said container, means for supplying to the burner a volume of combustible gas bearing a predetermined relation to the volume of liquid heated in said container, means for bringing air into heat exchange relation with the liquid which has been brought to a predetermined temperature, and means for supplying this air to the burner.

5. In a device of the type described, the combination of means for supplying a liquid, means for bringing the liquid to a predetermined temperature, a container adapted to receive this liquid, a gas burner for supplying heat to the liquid in said container, means for supplying to the burner a volume of combustible gas bearing a predetermined relation to the volume of liquid heated in said container, means for bringing air into contact with the liquid which has been brought to a predetermined temperature, and means for supplying this air to the burner.

6. In a device of the type described, the combination of means for supplying a liquid, means for bringing a liquid to a predetermined temperature, a container adapted to receive this liquid, a gas burner for supplying heat to the liquid in said container, means for supplying combustible gas, means for bringing this gas to a temperature approximately equal to the said predetermined temperature, means for supplying to the burner a volume of this gas bearing a predetermined relation to the volume of liquid heated in said container, means for bringing air to approximately said predetermined temperature, and means for supplying this air to said burner.

7. In a device of the type described, the combination of means for supplying a liquid, means for cooling the liquid to a predetermined temperature, a container adapted to receive the cooled liquid, a gas burner for supplying heat to the liquid in said container, means for supplying combustible gas, means for bringing this gas into heat exchanging relation to the cooled liquid to equalize the temperatures of the gas and liquid, means for supplying to the burner a volume of this gas bearing a predetermined relation to the volume of liquid heated in said container, means for bringing air into heat exchanging relation with the liquid, and means for supplying this air to said burner.

8. In a device of the type described, the combination of means for supplying a liquid, means for cooling the liquid to a predetermined temperature, a container adapted to receive the cooled liquid, a gas burner for supplying heat to the liquid in said container, means for supplying combustible gas, means for bringing this gas into heat exchanging relation to the cooled liquid to equalize the temperatures of the gas and liquid, means for supplying to the burner a volume of this gas bearing a predetermined relation to the volume of liquid heated in said container, means for bringing air into contact with the cooled liquid, means for supplying this air to said burner, means for removing the liquid from said container, means for cooling this liquid, and means for returning the same to the container.

9. In a device of the type described, the combination of a liquid container, a gas burner for supplying heat to liquid in said container, means for supplying a volume of liquid to said container, and means for supplying to said burner a volume of gas bearing a predetermined relation to the volume of liquid supplied to said container, having a predetermined temperature and pressure, means for removing the liquid from said container, means for cooling the liquid, and means for returning the same to the container.

10. In a device of the type described, the combination of a liquid container, a gas burner for supplying heat to the container, means for continuously supplying equal volumes of liquid and gas to the container and burner, respectively, the gas being supplied under predetermined conditions of temperature and pressure, means for removing the liquid from said container, means for cooling this liquid, and means for continuously returning the same to the container.

11. In a device of the type described, the combination of a liquid container, means for supplying heat to liquid in said container, means for continuously supplying liquid to said container, a mixing receptacle communicating with said container and having a liquid outlet, means for agitating the liquid in said receptacle, and indicating means responsive to the temperature of the liquid before it has been heated in said container and after it has been agitated in said receptacle.

12. In a device of the type described, the combination of means for supplying a liquid, means for bringing the liquid to a predetermined temperature, a container adapted to receive this liquid and having a discharge port, a gas burner for supplying heat to the liquid in said container, means for supplying to the burner a volume of combustible gas bearing a predetermined relation to the volume of liquid heated in said container, and means connecting the discharge port of the container to the means for supplying liquid.

13. In a device of the type described, the combination of means for bringing a liquid to a predetermined temperature, a container adapted to receive this liquid, a gas burner for supplying heat to the liquid in said container, means for supplying combustible gas, means for bringing this gas to a temperature approximately equal to said predetermined temperature, means for supplying to the burner a volume of this gas bearing a predetermined relation to the volume of liquid heated in said container, and means for conveying the liquid from the container to the means for bringing the liquid to a predetermined temperature.

14. In a device of the type described, the combination of means for supplying a liquid, means for cooling the liquid to a predetermined temperature, a container adapted to receive the cooled liquid, a gas burner for supplying heat to the liquid in said container, means for supplying combustible gas, means for bringing this gas into heat exchanging relation to the cooled liquid to equalize the temperature of the gas and liquid, means for supplying to the burner a volume of this gas bearing a predetermined relation to the volume of liquid heated in said container, and means for conveying the liquid from said container to said cooling means.

15. In a device of the type described, the combination of a liquid container, a gas burner for supplying heat to liquid in said container, means for supplying a volume of liquid to said container, and means for supplying to said burner a volume of gas bearing a predetermined relation to the volume of liquid supplied to said container having a predetermined temperature and pressure, means for supplying to the burner air having a predetermined temperature, means for removing the liquid from said container, means for cooling the liquid, and means for returning the same to the container.

16. In a device of the type described, the combination of a liquid container, a gas burner for supplying heat to liquid in said container, means for supplying a volume of liquid to said container, and means for supplying to said burner a volume of gas having a predetermined temperature and pressure and bearing a predetermined relation to the volume of liquid supplied to said container; means for removing the liquid from said container, means for bringing air for said burner into heat exchanging relation with the liquid from said container, means for cooling the liquid, and means for returning the liquid to said container.

17. In a device of the type described, the combination of a liquid container, a gas burner for supplying heat to liquid in said container, means for supplying a volume of liquid to said container, means for supplying to said burner a volume of gas bearing a predetermined relation to the volume of liquid supplied to said container and having a predetermined temperature and pressure, cooling means comprising a plurality of concentric coils supplied with a cooling medium for receiving and cooling said liquid leaving said container, and means for returning the cooled liquid from said cooling means to said means for supplying the liquid to said container.

18. In a device of the type described, the combination of a liquid container, a gas burner for supplying heat to the container, means for continuously supplying an equal volume of liquid and gas to the container and burner respectively, the gas being supplied under predetermined conditions of temperature and pressure, means for cooling said liquid after it has passed through said container comprising a receptacle containing a plurality of connected concentric coils supplied with a cooling medium, a baffle disposed between said coils for directing said liquid into contact with said coils successively, and means for returning the cooled liquid from said receptacle to the means for supplying the liquid to said container.

19. In a device of the type described, the combination of a liquid container, a gas burner for supplying heat to the container, means for continuously supplying an equal volume of liquid and gas to the container and burner, respectively, the gas being supplied under predetermined conditions of temperature and pressure, means for returning said liquid from said container to said means for supplying liquid to said container, and means for cooling the liquid leaving said container comprising a receptacle containing two concentric connected coils, means for supplying a cooling medium successively to the inner coil and the outer coil, said inner coil having its successive convolutions close together, and a baffle between said coils, whereby the liquid first passes within said inner coil, then between said inner coil and said baffle, and finally into contact with said outer coil.

20. In a device of the type described, the combination of means for supplying a liquid, means for bringing the liquid to a predetermined temperature, a container adapted to receive this liquid, a gas burner for supplying heat to the liquid in said container, means for supplying to the burner a volume of combustible gas bearing a predetermined relation to the volume of liquid heated in said container, means for bringing air into heat exchanging relation with some of said liquid at said predetermined temperature, and means for supplying this air to said burner.

21. In a device of the type described, the combination of means for supplying a liquid, means for bringing the liquid to a predetermined temperature, a container adapted to receive this liquid, a gas burner for supplying heat to the liquid in said container, means for supplying to the burner a volume of combustible gas bearing a predetermined relation to the volume of liquid heated in said container, means for bringing air into direct contact with some of said liquid before said liquid enters said container, means for heating said air from said liquid as it leaves said container, and means for supplying said air to said burner.

22. In a device of the character described, the combination of a liquid tank, means for bringing a liquid to a predetermined temperature and supplying said liquid to said tank, a container adapted to receive the liquid from said tank, a gas burner for supplying heat to the liquid in said container, means for supplying to the burner a volume of combustible gas bearing a predetermined relation to the volume of liquid supplied to said container, means for bringing air into contact with liquid from said tank, and means for supplying this air to the burner.

23. In a device of the character described, the combination of a tank, means for supplying a liquid to said tank at a predetermined temperature, a container adapted to receive liquid from said tank at a lower rate than that at which liquid is supplied to said tank, a gas burner for supplying heat to the liquid in said container, means for supplying to the burner a volume of combustible gas bearing a predetermined relation to the volume of liquid supplied to said container, an overflow pipe for said tank, a compartment through which the overflowing liquid from said tank passes, transparent walls on said compartment to permit the observation of this liquid flow, means for bringing air into direct contact with the water in said compartment, and means for supplying this air to the burner.

24. In a device of the character described, the combination of a tank, means for supplying a liquid to said tank at a predetermined temperature, a container adapted to receive liquid from said tank at a lower rate than that at which liquid is supplied to said tank, a gas burner for supplying heat to the liquid in said container, means for supplying to the burner a volume of combustible gas bearing a predetermined relation to the volume of liquid supplied to said container, an overflow pipe for said tank, a compartment through which the overflowing liquid from said tank passes, transparent walls on said compartment to permit the observation of this liquid flow, means for bringing air into direct contact with the water in said compartment and for subsequently bringing this air into heat exchanging relation with the heated liquid flowing from said container, and means for supplying this air to the burner.

In testimony whereof I affix my signature.

SAMUEL W. PARR.